(12) United States Patent
Delaney et al.

(10) Patent No.: US 10,279,583 B2
(45) Date of Patent: May 7, 2019

(54) SYSTEM AND METHOD FOR STORING DIGITALLY PRINTABLE SECURITY FEATURES USED IN THE CREATION OF SECURE DOCUMENTS

(71) Applicant: CTPG Operating, LLC, Ithaca, NY (US)

(72) Inventors: Robert Delaney, Ithaca, NY (US); Kyle Turner, Binghamton, NY (US)

(73) Assignee: CTPG OPERATING, LLC, Ithaca, NY (US)

( * ) Notice: Subject to any disclaimer, the term of this patent is extended or adjusted under 35 U.S.C. 154(b) by 0 days.

(21) Appl. No.: 14/634,105

(22) Filed: Feb. 27, 2015

(65) Prior Publication Data

US 2015/0249770 A1    Sep. 3, 2015

Related U.S. Application Data

(60) Provisional application No. 61/947,111, filed on Mar. 3, 2014, provisional application No. 61/947,121, filed
(Continued)

(51) Int. Cl.
*H04N 1/40*    (2006.01)
*B41F 19/02*   (2006.01)
(Continued)

(52) U.S. Cl.
CPC .............. *B41F 19/02* (2013.01); *B41J 2/325* (2013.01); *B41J 3/38* (2013.01); *G06F 3/1222* (2013.01); *G06F 3/1236* (2013.01); *G06F 3/1238* (2013.01); *G06F 3/1259* (2013.01); *G06F 3/1273* (2013.01); *G06F 3/1285* (2013.01);
(Continued)

(58) Field of Classification Search
None
See application file for complete search history.

(56) References Cited

U.S. PATENT DOCUMENTS 4,638,340 A    1/1987  Iiyama
4,827,425 A    5/1989  Linden
(Continued)

FOREIGN PATENT DOCUMENTS

CN    101105837    1/2008
CN    102509032    6/2012
(Continued)

OTHER PUBLICATIONS

Wilson, S., The "Security Printer" Model for CA Operations, Lockstep White Paper No. 3, Sep. 2005, pp. 1-7, Lockstep Consulting Pty Ltd.
(Continued)

*Primary Examiner* — Dung D Tran
(74) *Attorney, Agent, or Firm* — Bond, Schoeneck & King; Jonathan Gray; George McGuire

(57) ABSTRACT

The present invention relates to a system and method for storing digitally printable security features used in the creation of secure documents and, more particularly, to a system and method for storing incomplete portions of digitally printable security features (used in the creation of secure documents) on different devices/systems, and for merging the incomplete portions to form a fully formed complete security feature for printing by a printer.

14 Claims, 10 Drawing Sheets

Related U.S. Application Data on Mar. 3, 2014, provisional application No. 61/947,135, filed on Mar. 3, 2014, provisional application No. 61/947,143, filed on Mar. 3, 2014, provisional application No. 61/947,152, filed on Mar. 3, 2014, provisional application No. 61/947,160, filed on Mar. 3, 2014, provisional application No. 61/947,174, filed on Mar. 3, 2014, provisional application No. 61/947,197, filed on Mar. 3, 2014, provisional application No. 61/947,206, filed on Mar. 3, 2014, provisional application No. 61/947,214, filed on Mar. 3, 2014.

(51) Int. Cl.

| | |
|---|---|
| *G06F 3/12* | (2006.01) |
| *G06F 21/44* | (2013.01) |
| *G06F 21/60* | (2013.01) |
| *G06K 15/00* | (2006.01) |
| *H04N 1/00* | (2006.01) |
| *G06K 15/02* | (2006.01) |
| *H04N 1/32* | (2006.01) |
| *B41J 2/325* | (2006.01) |
| *B41J 3/38* | (2006.01) |

(52) U.S. Cl.
CPC .......... *G06F 3/1288* (2013.01); *G06F 3/1293* (2013.01); *G06F 3/1294* (2013.01); *G06F 21/44* (2013.01); *G06F 21/602* (2013.01); *G06F 21/608* (2013.01); *G06K 15/028* (2013.01); *G06K 15/4095* (2013.01); *H04N 1/00204* (2013.01); *H04N 1/3232* (2013.01); *H04N 2201/0082* (2013.01); *H04N 2201/3269* (2013.01)

(56) References Cited

U.S. PATENT DOCUMENTS

| | | | |
|---|---|---|---|
| 5,512,977 A | 4/1996 | Imai | |
| 5,552,009 A | 9/1996 | Zager | |
| 5,619,026 A | 4/1997 | Chou | |
| 5,991,411 A | 11/1999 | Kaufman | |
| 6,196,459 B1 | 3/2001 | Goman | |
| 6,202,155 B1 | 3/2001 | Tushie | |
| 6,203,069 B1 | 3/2001 | Outwater | |
| 6,335,799 B1 | 1/2002 | Provost | |
| 6,362,869 B1 | 3/2002 | Silverbrook | |
| 6,362,893 B1 | 3/2002 | Francis | |
| 6,367,011 B1 | 4/2002 | Lee | |
| 6,390,377 B1 | 5/2002 | Dlugos | |
| 6,394,358 B1 | 5/2002 | Thaxton | |
| 6,396,594 B1 | 5/2002 | French | |
| 6,597,385 B2 | 7/2003 | Verdyck | |
| 6,650,430 B2 | 11/2003 | Francis | |
| 6,738,903 B1 | 5/2004 | Haines | |
| 6,750,985 B2 | 6/2004 | Rhoads | |
| 6,985,600 B2 | 1/2006 | Rhoads | |
| 6,991,164 B2 | 1/2006 | Lemelson | |
| 7,025,269 B2 | 4/2006 | Marshall | |
| 7,099,026 B1 | 8/2006 | Hren | |
| 7,229,025 B2 | 6/2007 | Sussmeier | |
| 7,233,930 B1 | 6/2007 | Ryan, Jr. | |
| 7,284,279 B2 | 10/2007 | Morrison | |
| 7,286,150 B2 | 10/2007 | Hann | |
| 7,375,844 B2* | 5/2008 | Kitahara | G06F 17/243 358/1.16 |
| 7,383,768 B2 | 6/2008 | Reichwein | |
| 7,460,252 B2 | 12/2008 | Campbell | |
| 7,535,586 B2 | 5/2009 | Kumashio | |
| 7,546,952 B2 | 6/2009 | Knowles | |
| 7,556,444 B2 | 7/2009 | Kurashina | |
| 7,588,188 B2 | 9/2009 | Knowles | |
| 7,614,560 B2 | 11/2009 | Knowles | |
| 7,691,280 B2 | 4/2010 | Waldrop | |
| 7,852,359 B2 | 12/2010 | Evans | |
| 7,958,359 B2 | 6/2011 | Sharma | |
| 8,033,477 B2 | 10/2011 | Jones | |
| 8,045,191 B2 | 10/2011 | Yamanaka | |
| 8,085,438 B2 | 12/2011 | Hersch | |
| 8,100,330 B2 | 1/2012 | Bulan | |
| 8,156,416 B2* | 4/2012 | St Jacques, Jr. | G06F 21/608 715/200 |
| 8,203,583 B2 | 6/2012 | Wilsher | |
| 8,240,797 B2 | 8/2012 | Haas | |
| 8,335,933 B2* | 12/2012 | Humphrey | G06F 21/602 713/193 |
| 8,339,632 B2 | 12/2012 | Wasamoto | |
| 8,345,316 B2 | 1/2013 | Bradley | |
| 8,347,379 B2* | 1/2013 | Tsuzuki | G06F 21/608 358/1.14 |
| 8,355,180 B2 | 1/2013 | Wu | |
| 8,395,646 B2 | 3/2013 | Yamamoto | |
| 8,402,371 B2 | 3/2013 | Tang | |
| 8,424,751 B2 | 4/2013 | Liu | |
| 8,481,108 B2 | 7/2013 | Roth | |
| 8,496,186 B2 | 7/2013 | Ito | |
| 8,551,387 B2 | 10/2013 | Feldman | |
| 8,593,696 B2 | 11/2013 | Picard | |
| 8,687,241 B2 | 4/2014 | Simske | |
| 8,736,897 B2 | 5/2014 | Pierce | |
| 8,826,004 B2 | 9/2014 | Euchner | |
| 9,577,996 B2* | 2/2017 | Heinrich | G06F 17/30091 |
| 2002/0042884 A1 | 4/2002 | Wu | |
| 2002/0051167 A1 | 5/2002 | Francis | |
| 2003/0088160 A1 | 5/2003 | Halleck et al. | |
| 2003/0145218 A1 | 7/2003 | Hutchison | |
| 2004/0050936 A1 | 3/2004 | Look | |
| 2004/0179078 A1 | 9/2004 | Gundjian | |
| 2005/0057764 A1* | 3/2005 | Kobziar | G06T 11/60 358/1.9 |
| 2006/0044589 A1 | 3/2006 | Nakagawaji | |
| 2006/0082797 A1* | 4/2006 | Gardner | G06K 15/107 358/1.8 |
| 2006/0212715 A1 | 9/2006 | Terao | |
| 2006/0283939 A1* | 12/2006 | Hwang | G06F 21/606 235/382 |
| 2007/0091377 A1 | 4/2007 | Smith | |
| 2007/0103536 A1 | 5/2007 | Fujimaki | |
| 2008/0144116 A1* | 6/2008 | Pauly | G07B 17/00733 358/3.28 |
| 2009/0086967 A1 | 4/2009 | Ozawa | |
| 2009/0279143 A1 | 11/2009 | St Jacques, Jr. | |
| 2010/0012736 A1 | 1/2010 | Wilds | |
| 2010/0071077 A1 | 3/2010 | Morris | |
| 2010/0108874 A1 | 5/2010 | Zahedi | |
| 2010/0162004 A1* | 6/2010 | Dodgson | G06F 21/805 713/193 |
| 2010/0208889 A1* | 8/2010 | Humphrey | G06F 21/602 380/44 |
| 2011/0000967 A1* | 1/2011 | Labrec | G06K 19/08 235/488 |
| 2011/0016388 A1 | 1/2011 | Tang | |
| 2011/0045256 A1 | 2/2011 | Luther | |
| 2011/0123132 A1 | 5/2011 | Schneck | |
| 2012/0176651 A1 | 7/2012 | Pham | |
| 2013/0015236 A1 | 1/2013 | Porter | |
| 2013/0141755 A1 | 6/2013 | Miller | |
| 2013/0215474 A1* | 8/2013 | Caton | H04N 1/0087 358/3.28 |
| 2013/0320099 A1 | 12/2013 | Acton | |
| 2014/0185800 A1 | 7/2014 | Fallon | |
| 2014/0233053 A1 | 8/2014 | Kakutani | |

FOREIGN PATENT DOCUMENTS

| | | |
|---|---|---|
| CN | 102658739 | 9/2012 |
| JP | 2003334997 | 11/2003 |
| JP | 2005202553 | 7/2005 |
| JP | 2007058535 | 3/2007 |
| KR | 20040099065 | 11/2004 |

(56) References Cited

FOREIGN PATENT DOCUMENTS

| KR | 20040100540 | 12/2004 |
|---|---|---|
| WO | 2005051676 | 6/2005 |
| WO | 2009106107 | 9/2009 |

OTHER PUBLICATIONS

Security Printing and Seals, Chapter 14, pp. 433-455.
Simske, S., Aronoff, J., Sturgill, M., Security Printing Deterrents: A Comparison of Thermal Ink Jet, Dry Electrophotographic, and Liquid Electrophotographic Printing, Journal of Imaging Science and Technology, 2008, vol. 52(5).
Jordan, F., Yribar, J., Turning Your Smartphone Into an Authentication Device, International Pharmaceutical Industry, 2013, pp. 104-112, vol. 5, Issue 3.
Lexmark Cutting-Edge Security for Printers and MFPs brochure, Lexmark, 2011.
Hattersley, J., Invisible and Fluorescing Bar Code Printing and Reading, InData Systems, Industrial Data Entry Automation Systems Incorporated, pp. 1-12.
Digital Printing Security Solutions, Best Practices, Kodak, 2011.
Extend Labeling Control Beyond the Enterprise, http://www.nicelabel.com/products/powerforms-web, Jun. 25, 2014.
Security Features of Lexmark Laser Printers: Overview, Technical White Paper, Lexmark, copyright 2005.
PCT International Search Report dated May 19, 2015.
Data Splitting; Retrieved from https://web.archive.org/web/20110514225526/http://searchsecurity/techtarget.com/definition/data-splitting?vgnextfmt=print, retrieved on Aug. 18, 2015.

\* cited by examiner

SYSTEM AND METHOD FOR STORING DIGITALLY PRINTABLE SECURITY FEATURES USED IN THE CREATION OF SECURE DOCUMENTS

RELATED APPLICATION DATA

The present application claims priority to and the benefit of U.S. provisional patent application No. 61/947,111, filed on Mar. 3, 2014; U.S. provisional patent application No. 61/947,121, filed on Mar. 3, 2014; U.S. provisional patent application No. 61/947,135, filed on Mar. 3, 2014; U.S. provisional patent application No. 61/947,143, filed on Mar. 3, 2014; U.S. provisional patent application No. 61/947,152, filed on Mar. 3, 2014; U.S. provisional patent application No. 61/947,160, filed on Mar. 3, 2014; U.S. provisional patent application No. 61/947,174, filed on Mar. 3, 201; U.S. provisional patent application No. 61/947,197, filed on Mar. 3, 2014; U.S. provisional patent application No. 61/947,206, filed on Mar. 3, 2014; and U.S. provisional patent application No. 61/947,214, filed on Mar. 3, 2014, the entire contents of which are hereby incorporated by reference.

BACKGROUND OF THE INVENTION

1. Field of the Invention

The present invention relates to a system and method for storing digitally printable security features used in the creation of secure documents and, more particularly, to a system and method for storing incomplete portions of digitally printable security features (used in the creation of secure documents) on different devices/systems, and for merging the incomplete portions to form a fully formed complete security feature for printing by a printer.

2. Description of the Related Art

Security documents are used across a diverse marketplace to deter fraud, counterfeiting and theft. In most cases, the security documents are pre-printed on media. The pre-printed media must be stored in a secure location so that counterfeiters and thieves are not able to obtain the secure media which would allow them to freely print fraudulent documents.

Security printing relates to the practice of manufacturing media substrate with certain security indicia/features/patterns to prevent forgery and counterfeiting of security documents such as passports, checks, and prescription pads. As should be understood by those of ordinary skill in the art, security printing can include, for example, the inclusion of watermarks, UV coatings, security fibers, microprinting, holograms, phosphorescent inks, and pantographs (e.g., "void") etc. in the manufacture of the media substrate.

There are digital printers that can print these secure features on demand on standard media. The advantage of these printers is that standard media does not have to be secured from theft as the secure documents can be created on demand. However, the digital printer must be set up with features/methods that disable printing of these secure features if a thief were to steal the printer.

Description of the Related Art Section Disclaimer: To the extent that specific patents/publications/products are discussed above in this Description of the Related Art Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

The present invention recognizes that there are potential problems and/or disadvantages with the conventional technology used in the storage of security indicia/features/patterns. For example, typically one device (whether it is a computer or server connected to a printer or the printer itself) stores a complete security feature in memory. If a hacker was able to copy the security feature from the single device memory (e.g., from a printer memory), the hacker would be able to use the illegally obtained security feature to create unauthorized reproductions of the secure documents. Various embodiments of the present invention may be advantageous in that they may solve or reduce one or more of the potential problems and/or disadvantages discussed above.

Various embodiments of the present invention may exhibit one or more of the following objects, features and/or advantages:

It is therefore a principal object and advantage of the present invention to provide a system that is structured, configured, connected, and/or programmed to store incomplete parts/portions of security feature(s) such as pantographs (e.g., void), watermarks, microprinting, verification grids, validation marks, color, uv and/or IR marks, unique secure barcodes, serial numbers, anti-copying marks such as an Eurion mark, any combination thereof, and any other security feature as should be understood by those of skill in the art, on separate multiple devices and/or systems.

It is another object and advantage of the present invention to provide a system that is structured, configured, connected, and/or programmed to merge/combine the incomplete parts/portions of the security feature(s) to form a fully formed complete security feature suitable for printing by a printer (preferably a digital printer) on a media substrate (e.g., thermal media substrate by a thermal printer or standard media substrate by a thermal transfer printer, as should be understood by those of skill in the art). These security features can be used to prevent forgery and counterfeiting of items such as passports, checks, and prescription pads.

It is a further object and advantage of the present invention to provide a method for storing incomplete parts/portions of security feature(s) on separate multiple devices and/or systems, merging/combining the incomplete parts/portions of the security feature(s) to form a fully formed complete security feature, and printing the complete security feature by a printer (preferably a digital printer) on a media substrate. These steps can preferably be performed on demand and in real time.

In accordance with the foregoing objects and advantages, an embodiment of the present invention is directed to a system that is structured, configured, connected, and/or programmed to store incomplete parts/portions of security feature(s) on multiple devices/systems and can include, but is not limited to, (1) a printer with a memory that can store at least a first incomplete part/portion of at least a first security feature (and preferably, a plurality of security features), (2) a host computer with a memory connected to the printer (through a wired or wireless connection) that can store at least a second part/portion of the at least first security feature, and/or (3) at least one server computer with a memory connected to the printer and/or the host computer (through a wired or wireless connection) that can store at least a third part/portion of the at least first security feature. An embodiment of the present invention contemplates any number of incomplete portions of security features being stored on any number of devices/systems (preferably connected devices/systems that contain secure memory locations (e.g., password protected)). Another embodiment of the present invention contemplates that the printer is not required to store any incomplete parts of a security feature. The printer can be connected to other devices/systems that can store the incomplete parts of a security feature, and when needed, the incomplete parts can be combined to form the complete security feature and printed.

Any part of the system (including, but not limited to the printer, host computer, and/or server computer) can contain software or firmware to merge/combine the incomplete parts/portions of the security feature(s) to form a more complete security feature or to form the fully formed complete security feature. The fully formed complete security feature can then be transferred to the printer (if the printer is not the device that merged/combined certain incomplete parts/portions of the security feature(s) to form the complete security feature, which is can be). Once the fully formed complete security feature is received by the printer or formed by the printer (per its specific programming/firmware or instructions received by the host computer or server system), the printer is structured, configured, connected, and/or programmed to print the fully formed complete security feature on a media substrate on demand (e.g., thermal media substrate by a thermal printer or standard media substrate by a thermal transfer printer, as should be understood by those of skill in the art). The printer can also be structured, configured, connected, and/or programmed to store one or more fully formed complete security features in its local memory or in memory that is accessible by the printer (directly or indirectly) for later printing (as needed, but this is not preferable per the main security purpose of this system).

The printer's firmware can be programmed to print the at least one fully formed complete security feature(s) on demand that are stored in the printer's memory (or in the memory of a device/system connected to and accessible by the printer), and to merge the security feature(s) with variable data (such as receipt data, check data, financial data, identification data (birth certificate, pallet, container), contract data, ownership data (deeds, titles), legal data (trusts etc.), government data, prescription data, medical/healthcare data, public safety data (e.g., elevator inspections, health inspections), permit data (hunting licenses), ticket data, or label data (part identification), for example, as should be understood by those of skill in the art) preferably in real time depending on the particular application. The printer firmware can be updated by a host computer or other device/system (e.g., server computer) that is in wired or wireless communication with the firmware within the computer.

In accordance with a preferred embodiment of the present invention, a specialized improved computer system is created—here the devices and/or systems that are specifically structured, configured, connected, and/or programmed to store incomplete parts/portions of security feature(s), and work together to merge the incomplete parts/portions of security feature(s) to form a fully formed complete security feature, optionally to briefly store the fully formed complete security feature, and to print the fully formed complete security feature on demand with or without other data. This storage of incomplete parts/portions of security feature(s) of a security feature until needed makes it harder for a hacker to extract the complete digital image of the security pattern for unauthorized reproduction of secure documents.

The data transmission, communication, and any control signals between the at least one host computer, printer, and any server computers are sent and received pursuant to wired or wireless communication. The wireless communication/transmission can be over a network, which can be any suitable wired or wireless network capable of transmitting communication, including but not limited to a telephone network, Internet, Intranet, local area network, Ethernet, online communication, offline communications, wireless communications and/or similar communications means. The wireless transmission can be accomplished through any wireless protocol/technology, including, but not limited to, ZigBee standards-based protocol, Bluetooth technology, and/or Wi-Fi technology. Further, this data can be encrypted as needed based on the sensitivity of the data or the location the printer, for example. The devices can be located in the same room, in a different room in the same building, and/or in a completely different building and location from each other. A user using a host computer (or a different computer) can send data transmission, control or communication signals to instruct the printer to merge any incomplete parts/portions of security feature(s) to form a fully formed complete security feature, and/or to print a particular fully formed complete security feature (e.g., a particular pantograph loaded in memory of the printer) on a media substrate, and to merge the particular security feature with variable data.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
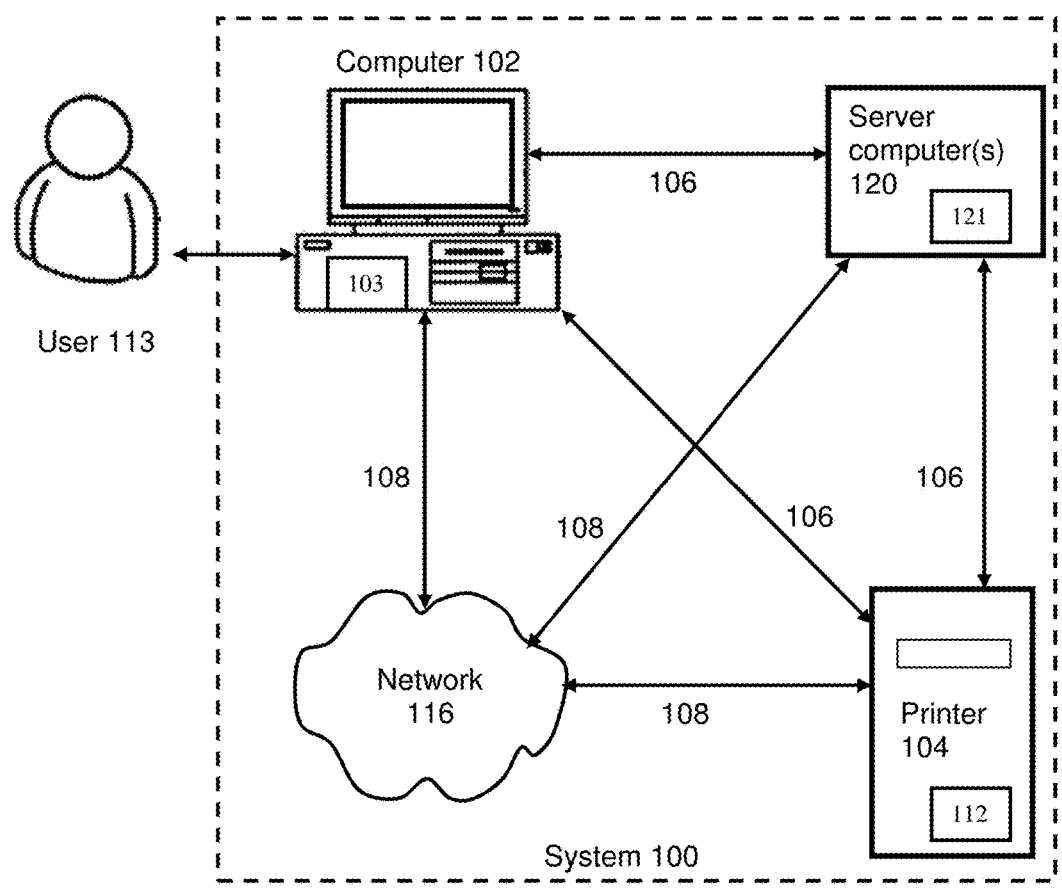
FIG. 1 is a system architecture diagram of components of a system of an embodiment of the present invention including a server computer(s), a host computer, and a printer with various data transmission, communication, and/or control links, according to an embodiment of the present invention.

The present invention will be more fully understood and appreciated by reading the following Detailed Description in conjunction with the accompanying drawings, wherein like reference numerals refer to like components.

Turning to FIG. 1, a system architecture diagram showing a printer 104, a computer 102 and server computer(s) 120 (collectively "components" and individually "component") with various data transmission, communication, and/or control links to and from each component, is shown according to an embodiment of the present invention. The data transmission, communication, and/or control connections between each of the computer 102, the server computer(s) and the printer 104, include a wired connection 106 and a wireless connection 108. A network 116 is also shown. Network 115 can be any suitable wired or wireless network capable of transmitting communication, including but not limited to a telephone network, Internet, Intranet, local area network, Ethernet, online communication, offline communications, wireless communications and/or similar communications means. The network 115 can comprise one or more servers (not shown) to facilitate the communication. The server can be any processor, server, mainframe computer, or other processor-based device capable of facilitating communication. These components can communicate with each other over the network 116 per the wireless connection 106 or per the wired connections 106, for example, as shown.

Figure 2:
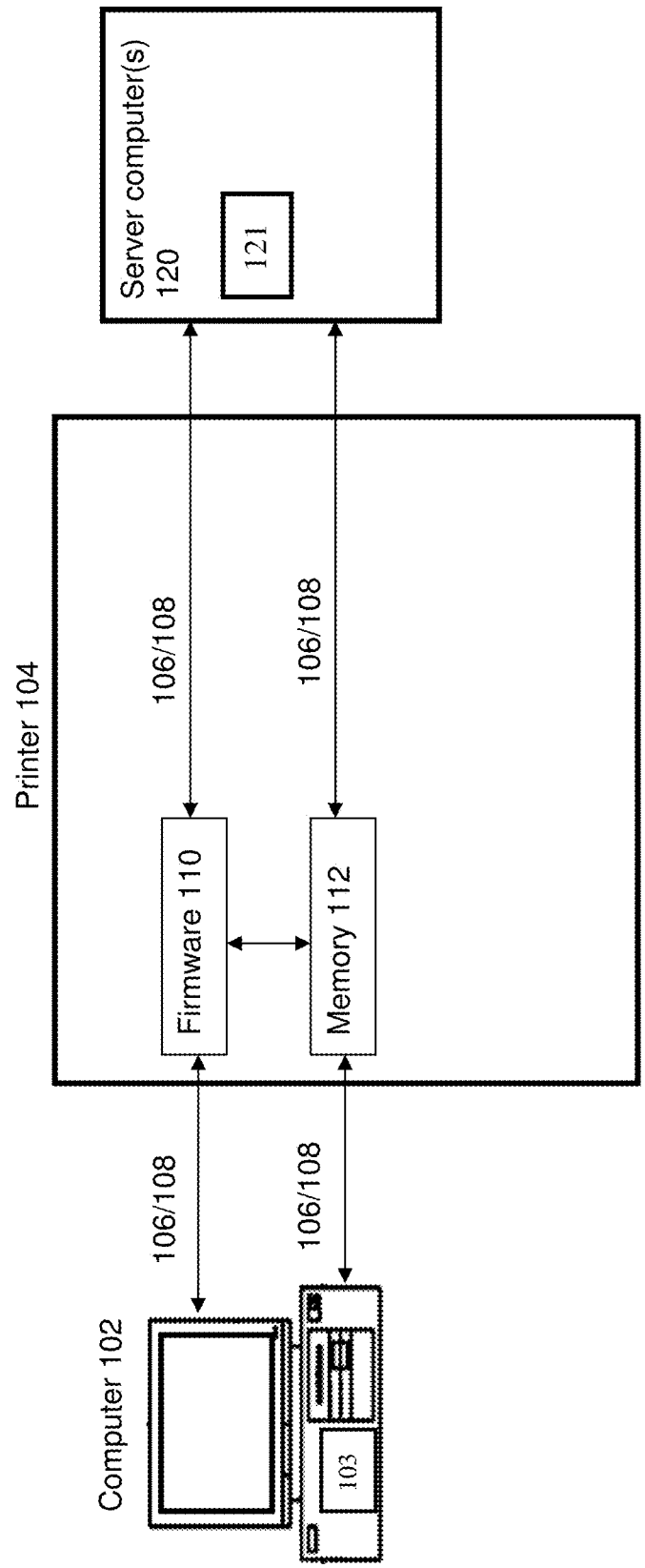
FIG. 2 is a more detailed system architecture diagram of the system shown in FIG. 1, according to an embodiment of the present invention.

Turning to FIG. 2, a more detailed system architecture diagram of the printer 104 shown in FIG. 1 is shown, according to an embodiment of the present invention. The printer 104 can include a (1) memory 112 that can store at least one incomplete portion/part of at least one complete security feature and preferably, a plurality of incomplete portions/parts of a plurality of security features, and (2) firmware 110 that can be programmed to perform all of the functionalities as described herein including merging incomplete portions/parts of at least one complete security feature to form a partially complete or complete security feature, and printing the security feature on media substrate while merging the security feature with other data including variable data (such as receipt, check, or prescription data, for example, as should be understood by those of skill in the art) preferably in real time depending on the particular application. The firmware 110 and memory 112 can have wired 106/wireless 108 communication connections to the computer 102 and to the server computer(s) 120. In an alternative embodiment, the security feature (such as a pantograph—See FIGS. 3-4) can be fully formed, stored, updated, etc. on the computer 102 and/or the server computer(s) 120 and then transmitted to the printer for printing.

In a preferred embodiment, when there is a need for the complete security feature to be printed, the printer 104 contains firmware 110 that is programmed to take the incomplete part of the security feature from its memory 112 and merge it with the other incomplete parts of the security feature that can be downloaded to the printer 104 from the external memory locations (e.g., 121 and 103) which can be in wired or wireless connection (106, 108) with the printer 104. The printer firmware 110 can be programmed to merge the incomplete parts/portions of the security feature in the non-permanent memory of the printer, and can be programmed to execute printing of the security feature and complete the secure document.

Figure 3:
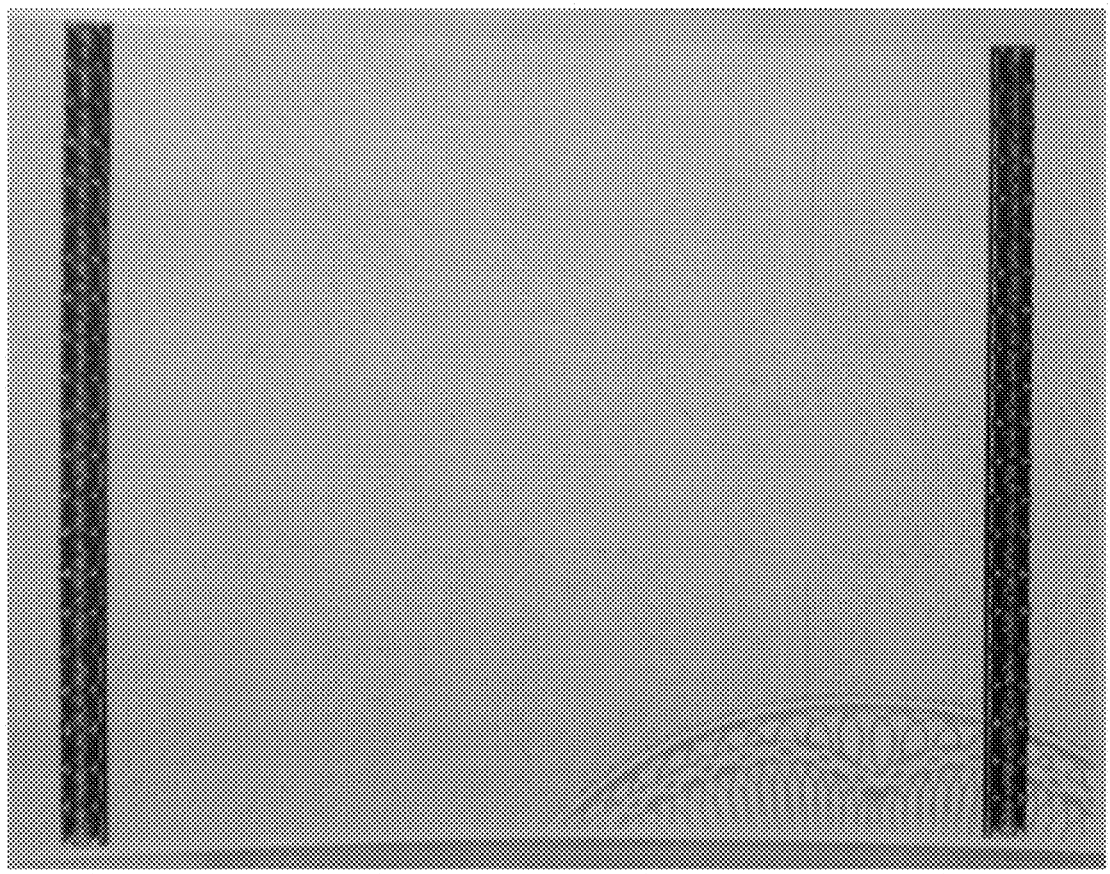
FIG. 3 is a photograph of a standard media substrate without variable data that was produced by the printer of an embodiment of the present invention.

FIG. 3 is a photograph of a media substrate without variable data that was produced by a printer of an embodiment of the present invention. This substrate was printed without any variable data. However, this substrate can also be printed with variable data, as described herein.

Figure 4:
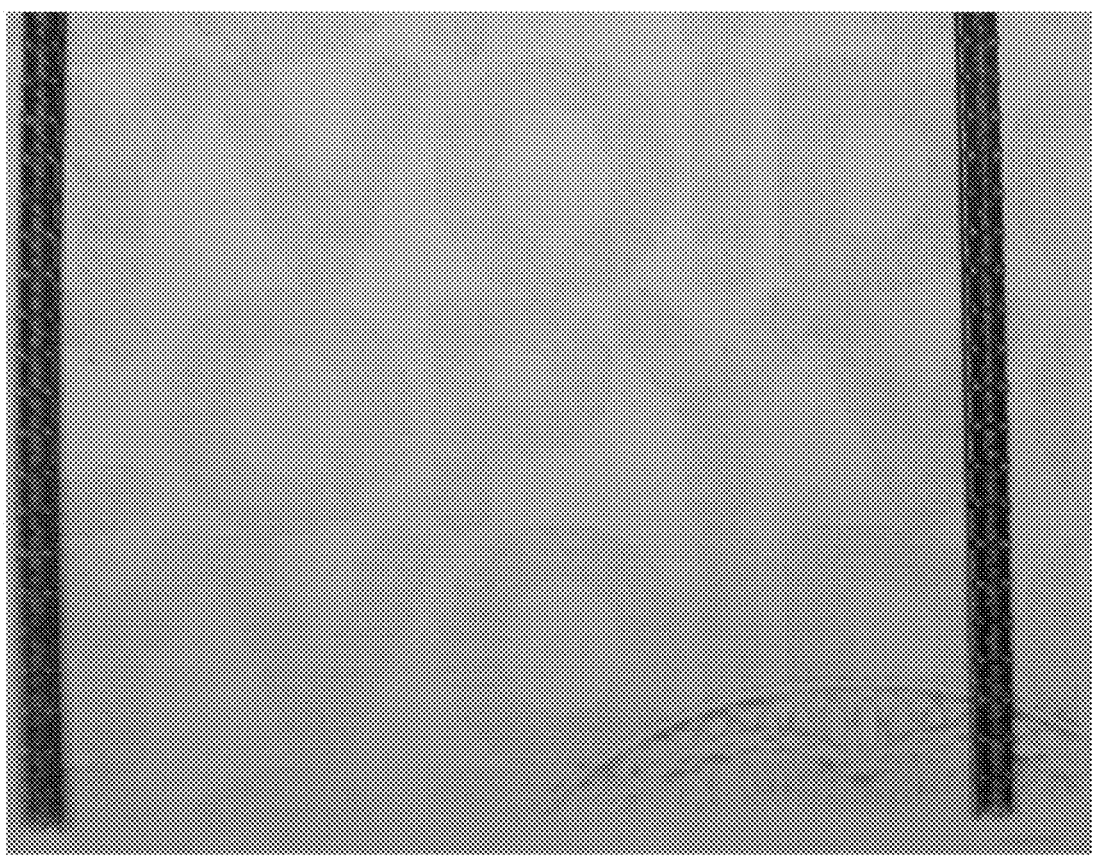
FIG. 4 is a photocopy of the photograph shown in FIG. 3.

The receipt shown in FIG. 3 was printed with a "void pantograph," which is not shown in the original standard media substrate shown in FIG. 3. However, the "void pantograph" is shown in FIG. 4, which is a photocopy of the photograph shown in FIG. 3. Thus, the "void pantograph" manufactured into the standard media substrate of FIG. 3 prevents the ability to make counterfeits of the standard media substrate of FIG. 3 through the process of photocopying.

The computer 102 can include a personal computer, desktop, laptop, and tablet, as well as any other fixed or mobile computerized device comprising a processor and a network connection and capable of communicating with the other components (e.g., printer 104 and server computer(s) 120). The computer, therefore, can be any processor-based device that is capable of facilitating a user's 113 access and interaction with the printer 104 and server computer(s) 120.

The server computer(s) 120 can include any type and number of server computers that are used for the purposes of cloud computing and storage, as should generally be understood by those of skill in the art. The server computers can include a master server and database(s), and a plurality of sub-servers (virtual or otherwise), some of which can be private servers requiring permissions (e.g., login, password) to gain access, depending on the specifics of the implementation required as described herein.

Each of the printer 104, computer 102, and server computer(s) 120 can include a processor that can comprise or are in communication with a non-transitory computer-readable medium on which is stored computer-executable program instructions (software, or firmware in the case of a printer 104) that are executed by the processor to cause the processor to perform one or more of the functionalities and/or method step described herein. In an alternative embodiment, a processor that works with a particular component can be located remotely instead of locally, and can be in wired or wireless communication with the component.

Each of the printer 104, computer 102, and server computer(s) 120 can include a local memory (112, 103, and 121, respectively, as shown in FIGS. 1-2), and can also include or otherwise be associated with a dedicated or shared database (e.g., in the cloud which can be associated with the server computer(s) 120, not shown). Each local memory or database can be structured, configured, connected, and/or programmed to store at least one incomplete part/portion of at least one security feature.

Each of the printer 104, computer 102, and server computer(s) 120 can be structured, configured, connected, and/or programmed to merge incomplete parts/portions of at least one security feature, whether or not one of the incomplete parts/portions to be merged is locally stored to the component performing a merging step, to form a more complete security feature and then to transmit the more complete security feature to another component to finalize and fully form the complete security feature (preferably at the printer, but it does not have to be finalized at the printer). An embodiment of the present invention contemplates that only one of the components "collect" each and every incomplete parts/portions of at least one security feature, and merge each and every incomplete part/portion of at least one security feature to finalize and fully form the complete security feature. This "collecting" and "merging" can be done directly by the printer automatically per the programming of the printer firmware (and/or as preferably controlled by the user giving commands at and through the computer 102) after each and every incomplete part/portion of at least one security feature are transmitted to and collected by the printer. The printer 14 can optionally store the fully formed complete security feature in memory 114, and print the fully formed complete security feature on demand with or without other data.

Figure 5:
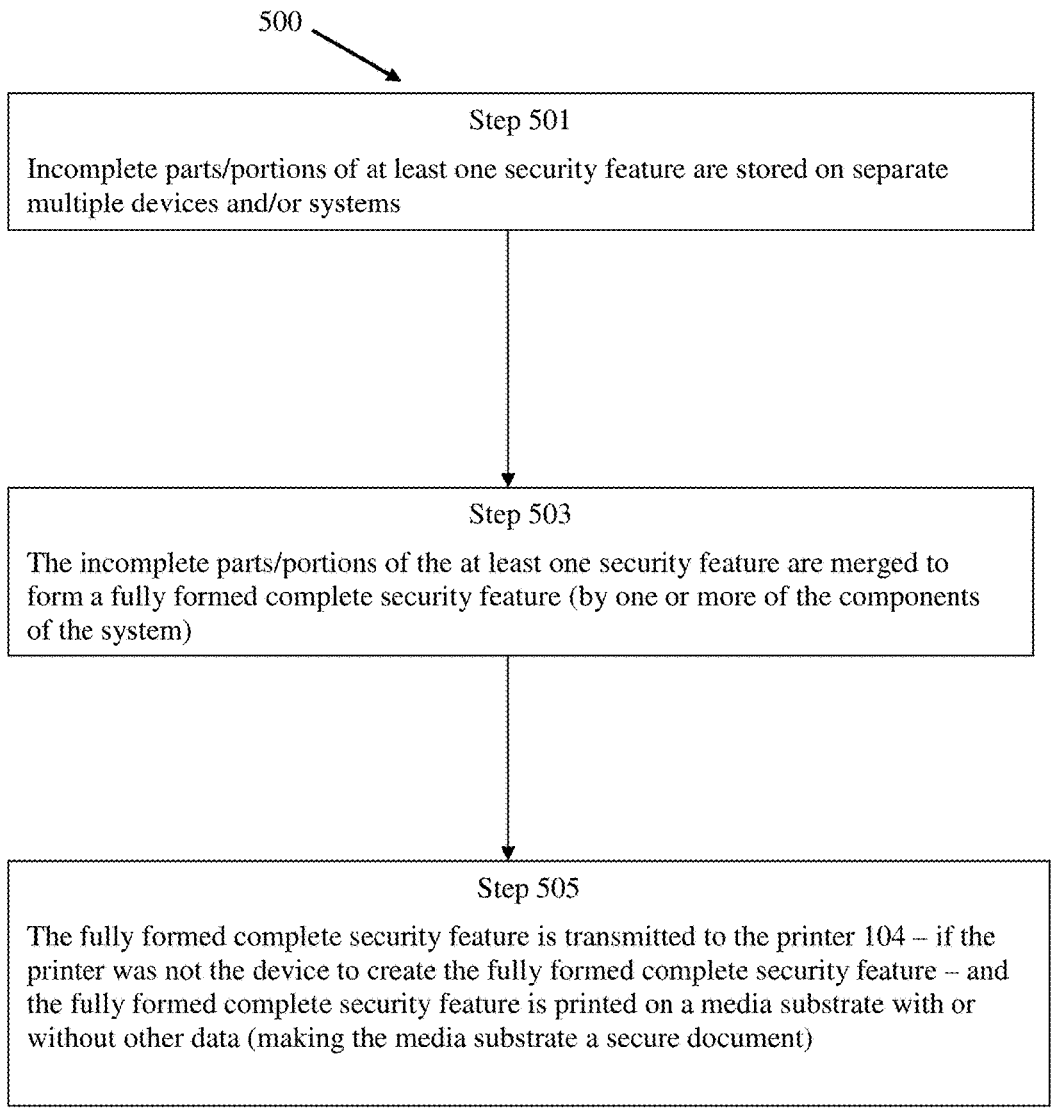
FIG. 5 is a flowchart showing a method for performing the functions of the system components described herein, according to an embodiment of the present invention.

In accordance with an embodiment of the present invention, there is provided a method for performing the functions of the system components described herein. The method can include one or more of the following steps as shown in FIG. 5. In step 501, incomplete parts/portions of at least one security feature are stored on separate multiple devices and/or systems. These devices or systems can include the printer 104, the computer 102, and/or the server computer(s) 120. In step 503, the incomplete parts/portions of the at least one security feature are merged to form a fully formed complete security feature (by one or more of the components) of the system). In step 505, the fully formed complete security feature is transmitted to the printer 104—if the printer was not the device to create the fully formed complete security feature—and the fully formed complete security feature is printed on a media substrate with or without other data (making the media substrate a secure document).

Figure 6:
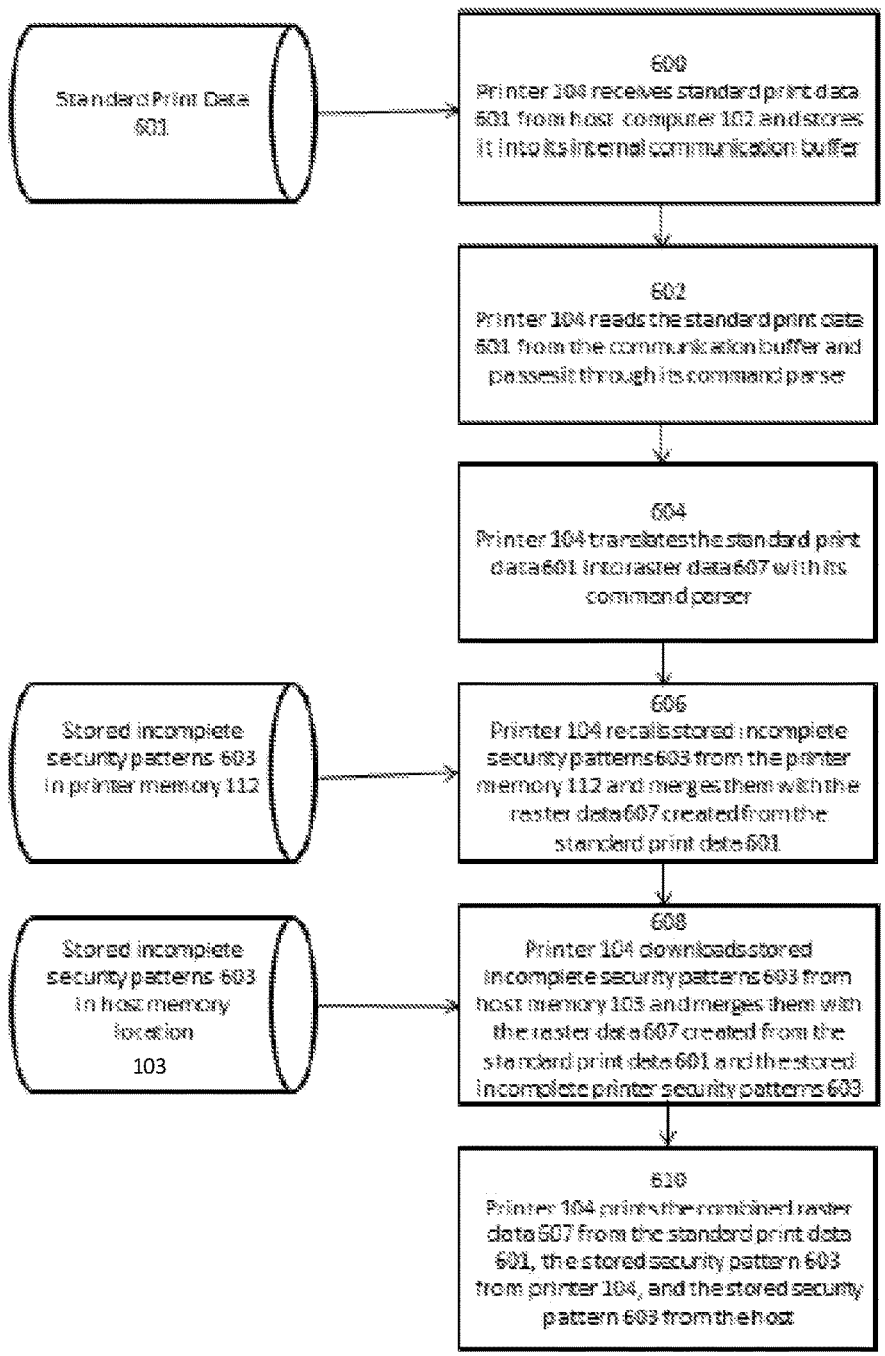
FIG. 6 is a flowchart showing a method for performing the functions of the system components described herein, according to an embodiment of the present invention.

Referring to FIG. 6, in one embodiment, a flowchart showing a method for performing the functions of the system components described herein, is provided. In step 600, the printer 104 receives standard print data 601 from the host computer 102 and stores it into the internal communication buffer of the printer 104. In step 602, printer 104 reads the standard print data 601 from the communication buffer and passes the standard print data 601 through the printer's 104 command parser. In step 604, printer 104 translates the standard print data 601 into raster data 607 with printer's 104 command parser. In step 606, printer 104 recalls stored incomplete security pattern(s) 603 from the printer memory 112 and merges it/them with the raster data created from the standard print data 601. In step 608, printer 104 downloads stored incomplete security patterns 603 from host memory 103 (and can also do the same with incomplete security patterns 603 stored in a server computer memory 121) and merges them with the raster data created from the standard print data 601 and the stored incomplete printer security patterns 603. In step 610, printer 104 prints the combined raster data from the standard print data 601, the stored security pattern 603 from printer 104, and the stored security pattern 603 from the host computer 102 (and can also print with a combined stored security pattern from a server computer 120).

Advantages of the invention are illustrated by the following Exemplary System, Uses and Functionalities description, in addition to the disclosure provided above. However, the particular components, uses, functionalities and amounts thereof recited in this description (as well as the description above), as well as other conditions and details, are to be interpreted to apply broadly in the art and should not be construed to unduly restrict or limit embodiments of the invention in any way.

Exemplary System, Uses, and Functionalities

As discussed herein, the printed security media (e.g., a document) can include several components, including, but not limited to a standard document, a security feature component(s) (elements of a complete security pattern to be printed on the standard document) initially stored in and received from printer memory 112, and a security pattern(s) (elements of a complete security pattern to be printed on the standard document) initially stored in and received from a host computers 113 and/or a server computer's memory 121 and transmitted to a printer to be combined/merged with the security pattern stored in the printer memory 112 to form a complete security feature/pattern on the standard document (making the document a secured or security document).

Figure 7:
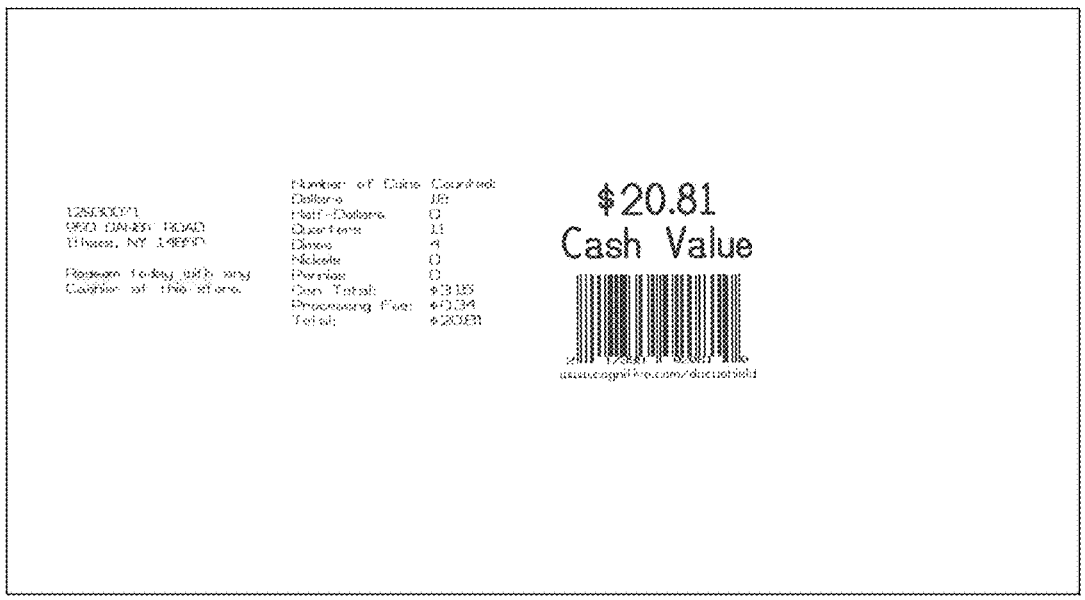
FIG. 7 is a schematic representation of a standard document with no security features, according to an embodiment of the present invention.

Referring to FIG. 7, a schematic representation of a standard document with no security features is shown. Standard text is printed with a standard barcode. The standard text could be any text that may be required by an end user.

Figure 8A:
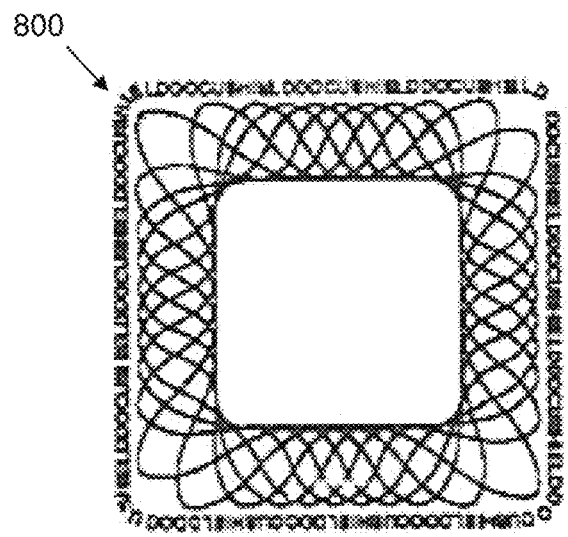
FIG. 8A is an example of security feature components initially stored in and received from a printer memory to be merged with other security feature components to form a complete security feature, according to an embodiment of the present invention.
Figure 8B:
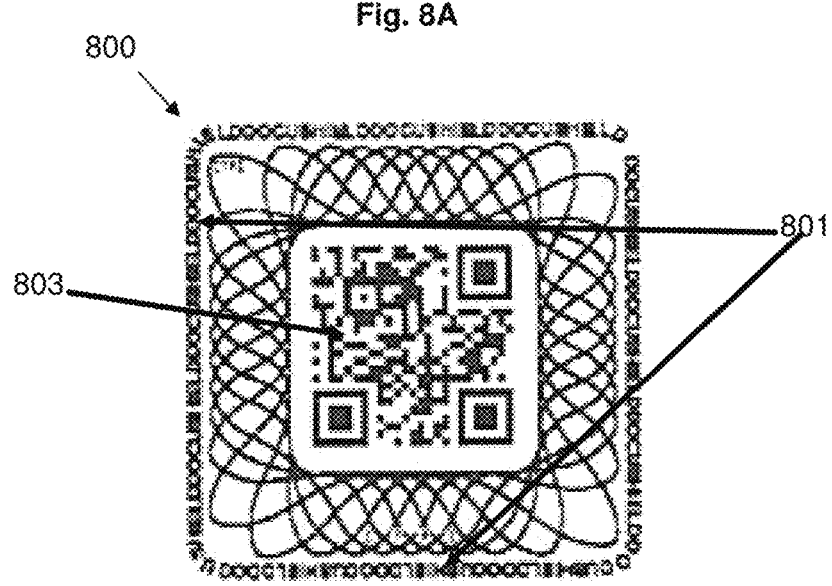
FIG. 8B is an example of security feature components, some of which can be initially stored in and received from a printer memory to be merged with other security feature components to form a complete security feature, according to an embodiment of the present invention.
Figure 8C:
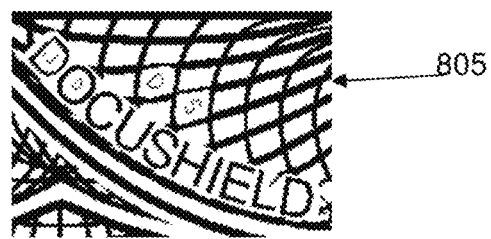
FIG. 8C is an example of security feature components initially stored in and received from a printer memory to be merged with other security feature components to form a complete security feature, according to an embodiment of the present invention.
Figure 8D:
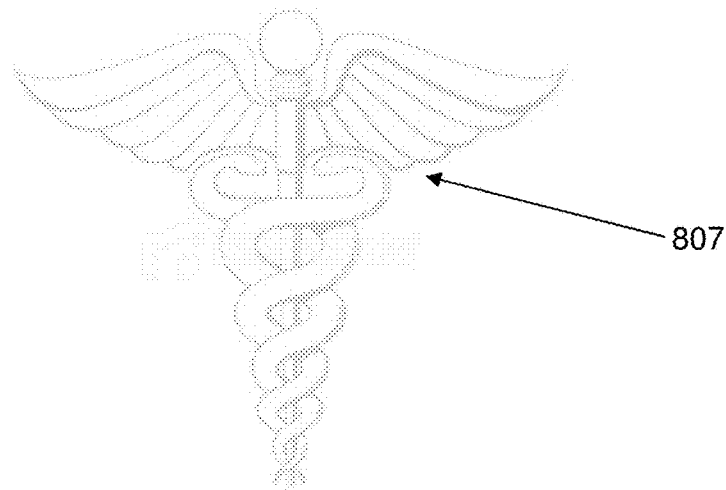
FIG. 8D is an example of security feature components initially stored in and received from a printer memory to be merged with other security feature components to form a complete security feature, according to an embodiment of the present invention.
Figure 8E:
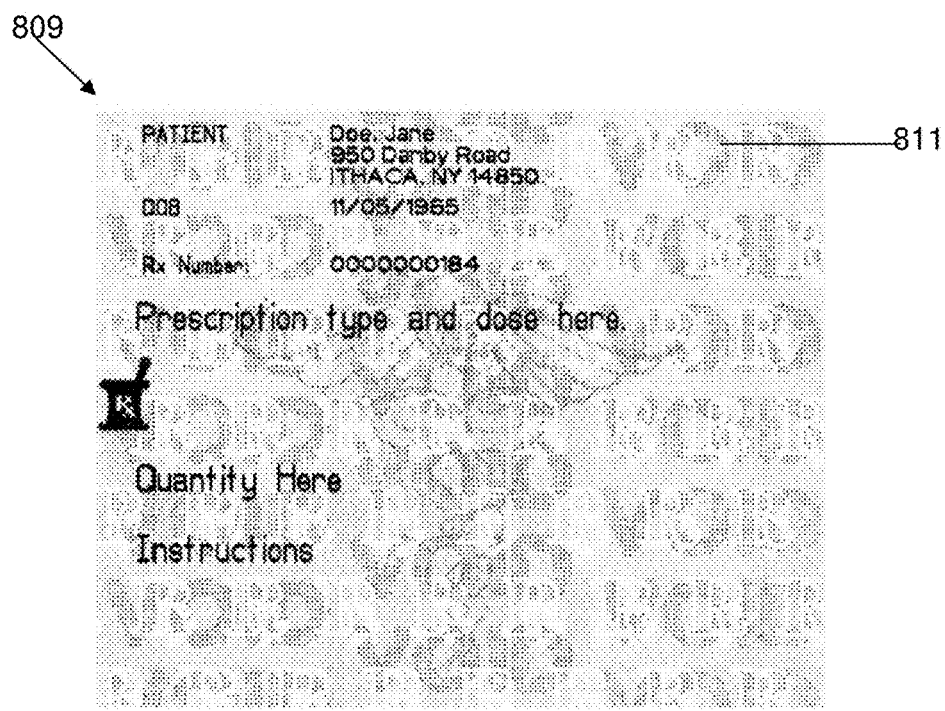
FIG. 8E is an example of security feature components initially stored in and received from a printer memory to be merged with other security feature components to form a complete security feature, according to an embodiment of the present invention.

Referring to FIGS. 8A-E, in some embodiments, examples of security feature components initially stored in and received from printer memory 112 are shown. These security feature components can require code (e.g., printer firmware) to extract from printer memory and print them in a precise location(s) on a media substrate. More specifically, FIG. 8A shows an ornamental emblem 800 with precise spacing to allow dynamic data to be printed covertly in and around the design when the full security document is printed. Turning to FIG. 8B, barcodes 803 with dynamic data can be precisely located within the ornamental emblem 800. This barcode data and location information of the printed barcode can preferably be stored as a security feature component outside the printer 104 in a host computer 102 or in a server computer 120 (although, an alternative embodiment contemplates storing this information in the printer 104). Dynamic data prints 801 using font stored preferably in the printer 104 and not on the host computer or in a server computer 120, are also shown. FIG. 8C shows a fine line border 805 with or without hidden text. FIG. 8D shows a printed watermark 807. FIG. 8E shows a secured document with a scan protected security background (i.e., when scanned or copied, the "Void" and other indicia can appear).

Figure 9:
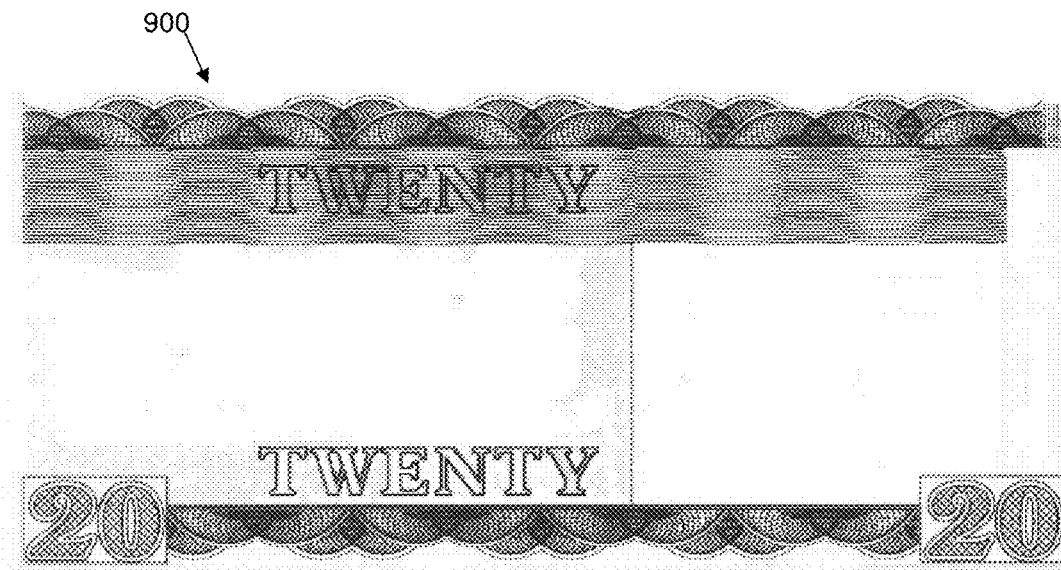
FIG. 9 are examples of security feature components initially stored in and received from host memory 103 and/or server computer memory 121 to be merged with other security feature components to form a complete security feature, according to an embodiment of the present invention.

Referring to FIG. 9, in one embodiment, examples of security patterns/feature components initially stored in and received from host memory 103 and/or server computer memory 121 are shown. Commands from the host computer 102, for example, can be used to download a security pattern (here, a graphic) that is located on a host computer memory 103. This security pattern graphic can be located on a separate host such as a secure server 120, which needs to eventually be transmitted to the printer 104 for merging with the security feature components stored on the printer to form the complete security pattern/feature. Access to and communication between both host 102 and printer 104 can be necessary to make the printing of the complete security pattern and document possible.

Figure 10:
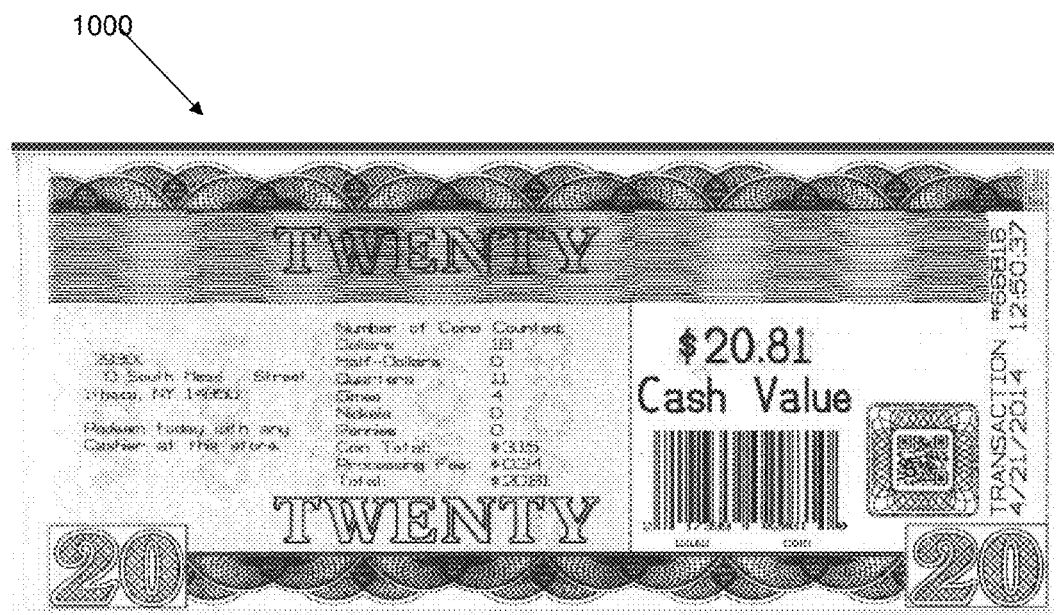
FIG. 10 is an example of combined security feature components from a printer and a host computer and/or a server computer printed on a media substrate.

Referring to FIG. 10, in one embodiment, an illustration of all of the combined components brought/merged together 1000 is shown—(1) standard document, (2) security feature component(s) initially stored in and received from printer memory 112, and (3) security feature components initially stored in and received from a host computers 113 and/or a server computer's memory 121 and transmitted to a printer to be combined/merged with the security pattern stored in the printer memory 112 to form a complete security pattern/feature on the standard document (making the document a secured or security document). In brief, the security features that were added to the standard document shown in FIG. 7 can include a fine line ornamental border, integrated micro text in border, serialized unique identifier, weighted drape line pattern, unique transaction number, date and time stamp, intentional defect added (second number in dollar value taller), copy protected hidden image, box guilloche, custom security fonts, micro print around guilloche, and cover layered 2D barcode. As noted above, these are just examples of the combinations of security feature component (s) that are possible and can be combined to form a complete security feature printed on a standard document. All other combinations of security features are contemplated with a variety of other security features or parts of security features being stored in various devices, which can be combined and printed to form a complete and final security feature printed on a standard document.

Embodiments of a thermal printer, examples of which can be used as the printer in conjunction with embodiments of the methods and systems described herein and shown in the referenced Figures, exist and are possible. Applicant hereby incorporates by reference the embodiments of thermal printer 104 disclosed in paragraphs [0010]-[0014] and [0028]-[0031] and FIGS. 1-4 of U.S. Pat. Application Publication No. 2015/0009271, entitled "System and Method of Thermal Printing Security Features." The thermal printer can be connected, configured, programmed and/or structured to perform the functions (e.g., storing, merging, and printing on thermal media substrate) described herein.

Embodiments of a thermal transfer printer, examples of which can be used as the printer in conjunction with embodiments of the methods and systems described herein and shown in the referenced Figures, exist and are possible. The thermal transfer printer can be connected, configured, programmed and/or structured to perform the functions (e.g., storing, merging, and printing on standard media substrate) described herein.

In accordance with an embodiment, a thermal print head element can have a dot resolution of 300 dots per inch (DPI) or higher to print security features at an acceptable dot resolution as set forth herein.

Even though thermal printers and thermal transfer printers are specifically referenced and described in certain embodiments herein, other digital printers and corresponding appropriate media substrates are contemplated to be part of the systems and methods described herein.

A "module," as may be used herein, can include, among other things, the identification of specific functionality represented by specific computer software code of a software program. A software program may contain code representing one or more modules, and the code representing a particular module can be represented by consecutive or non-consecutive lines of code.

As will be appreciated by one skilled in the art, aspects of the present invention may be embodied/implemented as a computer system, method or computer program product. The computer program product can have a computer processor or neural network, for example, which carries out the instructions of a computer program. Accordingly, aspects of the present invention may take the form of an entirely hardware embodiment, an entirely software embodiment, and entirely firmware embodiment, or an embodiment combining software/firmware and hardware aspects that may all generally be referred to herein as a "circuit," "module," "system," or an "engine." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, completely or partly on the printer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowcharts/block diagrams in the Figures illustrate the architecture, functionality, and operation of possible implementations of systems, methods, and computer program products according to various embodiments of the present invention. In this regard, each block in the flowcharts/block diagrams may represent a module, segment, or portion of code, which comprises instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While several embodiments of the invention have been discussed, it will be appreciated by those skilled in the art that various modifications and variations of the present invention are possible. Such modifications do not depart from the spirit and scope of the present invention.

What is claimed is:

1. A system comprising:
a printer comprising a memory;
a first computer with a memory, wherein the first computer is connected to the printer; and
a second computer with a memory, wherein the second computer is connected to the printer;
wherein:
at least two of the printer memory, the first computer memory, and the second computer memory each storing a separate incomplete sub-portion of a first complete security feature, stored therein, wherein the first complete security feature is formed from the entirety of each separate incomplete sub-portion, the first complete security feature having a predetermined appearance prior to storing the separate incomplete sub-portions, the predetermined appearance of the first complete security feature having a form to denote a document, upon which the first security feature is printed, as authentic;
at least one of the printer, the first computer, and the second computer comprises a non-transitory computer-readable storage medium having program code for merging the separate incomplete sub-portions of the first complete security feature to form the first complete security feature according to the predetermined appearance; and
the printer comprises a non-transitory computer-readable storage medium having program code for printing the formed first complete security feature on a substrate.

2. The system of claim 1, wherein the printer comprises the non-transitory computer-readable storage medium having program code for merging the separate incomplete sub-portions of the first complete security feature to form the first complete security feature.

3. The system of claim 1, wherein said printer is a thermal printer.

4. The system of claim 1, wherein said printer is a thermal transfer printer.

5. The system of claim 4, wherein the non-transitory computer-readable storage medium comprises program code for merging said first complete security feature with variable data on the substrate in real time.

6. The system of claim 1, wherein the non-transitory computer-readable storage medium comprises program code for merging said first complete security feature with variable data on the substrate.

7. The system of claim 6, wherein said variable data comprises variable data selected from the group consisting of receipt data, check data, financial data, identification data, contract data, ownership data, legal data, government data, prescription data, medical/healthcare data, public safety data, permit data, ticket data, and label data.

8. The system of claim 1, wherein said first complete security feature comprises a security feature selected from the group consisting of pantographs, watermarks, microprinting, verification grids, validation marks, color, uv marks, IR marks, barcodes, serial numbers, and anti-copying marks.

9. A method of forming a first complete security feature from separate incomplete sub-portions of the first complete security feature, the method comprising the steps of:

providing a printer comprising a memory, a first computer with a memory connected to the printer, and a second computer with a memory connected to the printer;

storing a separate incomplete sub-portion of a first complete security feature, in at least two of the printer memory, the first computer memory, and the second computer memory, wherein the first complete security feature has a predetermined appearance prior to storing the incomplete sub-portions, the predetermined appearance of the first complete security feature having a form to denote a document, upon which the first security feature is printed, as authentic;

merging the separate incomplete sub-portions of the first complete security feature to form the first complete security feature, wherein the first complete security feature is formed from the entirety of each separate incomplete sub-portion according to the predetermined appearance; and printing the formed first complete security feature on a substrate.

10. The method of claim 9, further comprising the step of receiving, at the printer, at least one incomplete sub-portion of the first complete security feature from at least one of the first computer and the second computer.

11. The method of claim 9, wherein the step of merging is performed by the printer.

12. The method of claim 9, further comprising the step of merging said first complete security feature with variable data on the substrate.

13. The method of claim 12, wherein the step of merging said first complete security feature with variable data is performed in real time.

14. The method of claim 9, wherein said first complete security feature comprises a security feature selected from the group consisting of pantographs, watermarks, microprinting, verification grids, validation marks, color, uv marks, IR marks, barcodes, serial numbers, and anti-copying marks.

* * * * *